(12) United States Patent
Warner et al.

(10) Patent No.: US 8,390,433 B2
(45) Date of Patent: Mar. 5, 2013

(54) METHOD AND SYSTEM FOR LOW COST, POWER EFFICIENT, WIRELESS TRANSPONDER DEVICES WITH ENHANCED FUNCTIONALITY

(75) Inventors: Robert Warner, Holmdel, NJ (US); James Wang, San Marino, CA (US); Jack Winters, Middletown, NJ (US); Ashok Waddodagi, Sayerville, NJ (US); Jin Yu, East Brunswick, NJ (US); Yuzheng Zhang, Marlboro, NJ (US)

(73) Assignee: Eigent Technologies Inc., Holmdel, NJ (US)

( * ) Notice: Subject to any disclaimer, the term of this patent is extended or adjusted under 35 U.S.C. 154(b) by 397 days.

(21) Appl. No.: 12/757,094

(22) Filed: Apr. 9, 2010

(65) Prior Publication Data

US 2011/0248834 A1 Oct. 13, 2011

(51) Int. Cl.
*H04Q 5/22* (2006.01)
(52) U.S. Cl. .................................................... 340/10.5
(58) Field of Classification Search .................. 340/10.4, 340/10.5, 10.3, 505
See application file for complete search history.

(56) References Cited

U.S. PATENT DOCUMENTS

| | | | |
|---|---|---|---|
| 6,087,930 A * | 7/2000 | Kulka et al. | 340/447 |
| 6,294,997 B1 * | 9/2001 | Paratore et al. | 340/572.1 |
| 6,363,269 B1 * | 3/2002 | Hanna et al. | 600/322 |
| 6,720,866 B1 * | 4/2004 | Sorrells et al. | 340/10.4 |
| 7,023,342 B2 * | 4/2006 | Corbett et al. | 340/572.1 |
| 7,026,935 B2 * | 4/2006 | Diorio et al. | 340/572.2 |
| 7,400,248 B2 * | 7/2008 | Yarvis | 340/539.26 |
| 7,405,659 B1 * | 7/2008 | Hyde | 340/572.4 |
| 7,791,478 B2 * | 9/2010 | Posamentier | 340/572.1 |
| 2006/0202804 A1 * | 9/2006 | Vijay-Pillai et al. | 340/10.33 |
| 2006/0273882 A1 * | 12/2006 | Posamentier | 340/10.4 |

* cited by examiner

*Primary Examiner* — Vernal Brown
(74) *Attorney, Agent, or Firm* — Porzio, Bromberg & Newman, P.C.

(57) ABSTRACT

A method and system for inventorying wireless transponders, specifically referred to as RFID transceiver devices. To provide higher functionality, a microcontroller is used in the RFID, along with a battery, but the clock frequency of the microcontroller is adjusted, based on external input, to minimize battery requirements. The RFID transceiver device includes at least one sensor coupled to the microcontroller. Data from the at least one sensor is stored in non-volatile memory of the microcontroller if the battery is at a predetermined low level, and is read later when the battery is at a higher level.

67 Claims, 6 Drawing Sheets

Data-0              Data-1

Data-0              Data-1

METHOD AND SYSTEM FOR LOW COST, POWER EFFICIENT, WIRELESS TRANSPONDER DEVICES WITH ENHANCED FUNCTIONALITY

GOVERNMENT INTERESTS

This patent is based on work supported by the US Army under Contract No. W81XWH-08-C-0014.

FIELD OF THE INVENTION

The present invention provides a system and method for the development and implementation of low cost, power efficient, wireless transponder devices with enhanced functionality, such as, but not limited to, sensors, extended memory, range, and security, that communicate with a reader/interrogator such that the devices can be identified and additional information can be known.

DESCRIPTION OF RELATED ART

The ability of actively powered, battery assisted passive (BAP), and passive wireless transponders with enhanced functionality to acquire, store and transmit additional data along with identifying data can have applicability to a wide variety of items. As such, a new class of Radio Frequency Identification (RFID) devices with enhanced functionality is emerging to effectively address the needs of these products that include, but are not limited to, medical supply items, pharmaceuticals, certain sensitive equipment and machines, chemicals, ordnance and food. Much of the enhanced functionality and data capture involves the current or past environment of the items.

Purely passive wireless transponder devices, when actively energized by a reader/interrogator, use the received source of electromagnetic (EM) energy to power themselves, to enable the data reception, to power other functional devices such as sensors and to backscatter or reflect their specific identification code and other data back to the interrogator. This type of wireless transponder device is capable of performing actions such as sensing only when the received source of energy is available.

U.S. Pat. No. 7,479,886 by Burr describes an RF harvesting that can be used to store energy into a capacitor such that the device can temporarily operate when the RF signal is no longer present. This patent has the limitation that its usage is quite limited since a large capacitor would be required to store enough energy to power other functions which would increase the overall size of the system. Additionally, the amount of energy which can be stored in capacitors is significantly lower than the amount of energy that can be stored in batteries. BAP wireless transponder devices use batteries to enhance their radio frequency (RF) communication abilities and provide other processing capabilities and functions. Actively powered wireless transponder devices use batteries to acquire and store data on demand as well as to enhance the reception and transmission of their RF communications.

Purely passive wireless transponder devices work on the principle of "RF harvesting" in which the reader sends a high power continuous wave (CW) tone preamble that persists over a period of time and is followed by a modulated message carrying the signaling information. "RF harvesting" techniques have been described. U.S. Pat. No. 7,385,511 by Muchkaev describes a reader which generates and transmits coded sequences of short high power pulses repeatedly to a transponder which receives and stores the pulse energy. This patent has the shortcoming that such coded sequences are not commonly employed by the standard-based systems. U.S. Pat. No. 7,400,253 by Cohen describes all forms of RF signals and EM energy, not just those transmitted from or provided by an RFID reader/interrogator, are used to provide power to an RFID transponder or to charge the battery. This patent has the shortcoming that in a practical situation the energy available in all forms of RF signals is not sufficiently high to power an RF harvesting circuit. U.S. Pat. No. 6,970,089 by Carrender describes two antennas which are configured to receive ambient radiation and use this energy to reflect a modulated signal for writing and reading data to and from the devices in the system. This patent has the shortcoming that while two antennas can improve the signal reception and backscattering, they also prohibitively increase the size of a transponder.

To receive a message from the reader, a passive wireless transponder device requires two essential elements, namely, an antenna and an "RF harvesting" circuit. The antenna serves both as a transducer, which converts the electromagnetic (EM) wave into an electrical waveform, and as an impedance transformer, which matches the free space impedance to the impedance of the frontend circuit in the wireless transponder device. The RF harvesting circuit, on the other hand, extracts energy from the signal and stores it in a storage element on the wireless transponder device. A typical realization of the RF harvesting circuit employs a Schottky diode to rectify the CW signal and store the energy as an electrical charge within one or more capacitors. The voltage across the storage capacitor is proportional to the amount of the electric charge. Once a sufficient charge is built up on the capacitor, the capacitor is then able to power the receiver and the processing circuit of the wireless transponder device to demodulate and decode the message from reader. RF harvesting only provides a limited amount of energy. Circuits on the wireless transponder device can only operate in the presence of a reader signal and for a small additional "persistence" time after the end of reader signal.

Purely passive wireless transponder devices are able to send information to a reader by a process called "backscattering". Backscattering is achieved by changing (modulating) the antenna impedance with the signaling waveform. When the antenna impedance is matched to an RF frontend circuit, the RF signal impinged on the antenna is absorbed by the RF frontend circuit, whereas, when the coupling between the antenna and the RF frontend circuit is open (or shorted), a higher amount of RF signal impinged on the antenna is reflected back or "backscattered" to the reader. A control signal is used to create the "matched" or "open (or shorted)" circuit conditions based on the polarity of the signal. The reader detects the RF power level changes in the reflected or "backscattered" signal from the passive wireless transponder device and decodes the message.

To store certain information permanently, a passive wireless transponder device incorporates a small amount of non-volatile memory to retain information in the absence of the reader signal. A typical realization of such non-volatile memory is a "flash" memory. Writing to the flash memory requires a higher voltage. A charge pump voltage multiplying circuit coupled to the RF harvesting circuit boosts the voltage high enough to allow the flash programming. Due to the limited available power, only a limited memory capacity is available on the passive wireless transponder device. Simple information such as an ID and serial number is stored in the device.

With a purely passive wireless transponder device implementation no power supply or battery is required. This significantly simplifies the wireless transponder device complexity and reduces its cost as compared to the conventionally powered wireless transponder device. Typical commercial passive wireless transponder devices are implemented by attaching a silicon die containing the required circuitry to a printed antenna strip on a flexible substrate using a thin film material. The passive wireless transponder device can then be affixed onto merchandise in a similar way as conventional "bar-coded" labels. In order to achieve a cost target approximating a "bar-coded" label, the available commercial passive wireless transponder devices are made with the minimum functionality that satisfies the current EPC global and/or ISO specifications. The limited on-chip processing capability is implemented with hard-wired circuits, which realistically cannot be altered without incurring a high non-recoverable engineering (NRE) cost and long re-design cycle. The construction is not flexible for expansion to include other functions as it does not provide any external interfaces for adaptation, adding memory capacity, or expansion in functionality. These restrictions make it difficult for the purely passive devices to be adapted to the specific needs of different customers and applications.

Actively powered wireless transponders or active transponders do provide the capability for adaptation, adding memory capacity or expansion in functionality such as sensing. The onboard power also provides the means to significantly increase the communication range as compared to that of the purely passive transponder devices.

The typical implementation of active transponders consists of an analog circuit and a digital circuit. These devices need to be active at all times to monitor the environment and therefore need a constant power supply. From a circuit implementation perspective, the power consumption of the analog circuit depends on the signal frequency. The higher the signal frequency, the higher the power consumption that is required. Thus, the RF transceiver analog circuit in an active transponder device consumes the most power. The power consumption of the digital logic circuit is proportional to the operational frequency of the logic gates (i.e., how often the logic state is flipped or the polarity is changed). For active transponders, the amount the power consumed by the digital logic circuit can often be controlled by adjusting its operating clock frequency. When active transponders are in either the receive or transmit mode, the peak power consumption is several orders of magnitude higher than that of purely passive transponders powered by RF harvesting.

Battery supply voltage for an active transponder depends not only on its state of charge, but also on the discharge current. This IR voltage drop is caused by discharge current (I) flowing through the internal resistance (R) of the battery. The voltage drop is higher at high currents and lower temperatures which exhibit increased resistance. When a battery is discharged, the voltage gradually decreases until it reaches the minimal voltage acceptable for the device which is called the end of discharge voltage (EDV), or the voltage where continuing discharge causes damage to the battery and an accelerated drop in discharge voltage. To support high peak power active transponders, large batteries with low internal resistance are required to prevent an excessive IR drop. The large batteries significantly increase the overall packaging size of the devices which in turn places severe constraints on the merchandise, boxes, or cargo to which the devices can be affixed.

To minimize the power consumption and thus the size of the power source, the system design for active transponders often minimizes the duty cycle in which the transponders are active. As an example, ISO 18000-7 active transponders used by the US Department of Defense (DoD) wake up for a duration of a few milliseconds every 2 seconds to achieve a low duty cycle in the standby mode. In order to wake up the active transponders, the reader first sends a long wake-up signal lasting more than 2 seconds. After all active transponders are in an "awake" state, the reader can read the tag contents. Once in the "awake" state, the duty cycle of the active transponders significantly increases to speed up the system response. After the reader/interrogator has interrogated all active transponders within a session, the reader/interrogator issues a command to lower the duty cycle of all active transponders.

The low duty cycle (long sleep period) of an active transponder system severely limits the response time, and the system level power management operation places constraints on the system design. Since the active transponders consume large amounts of power during their active state, the number of probes or reads by readers/interrogators affects how long a battery can last. Only very limited read/write cycles are typically supported by the battery of the active transponders. The battery requirements severely limit the size and weight reduction possibilities of the active transponder devices, which in turn places severe constraints on the merchandise, boxes, or cargo to which the devices can be affixed.

In additional to the problem of high power consumption, active transponder systems suffer from significantly higher costs than passive wireless transponder systems due to their higher complexity. It is also often difficult for a conventional microcontroller to interface to a variety of sensors or other external data collection devices.

The ability to be able to use an off-the-shelf commercial reader/interrogator with its back-end logistics system could significantly shorten the time to implement a system when higher functionality is required by an application, enabling a faster deployment as well as improving the reader/interrogator infrastructure return on investment (ROI).

It is desirable to provide a passive wireless transponder system which provides increased functionality, higher memory capacity, enhanced flexibility, and configurability similar to that of actively powered wireless transponders or active transponders. Such a passive wireless transponder system can eliminate the need for a large battery and therefore provide a small product form factor which reduces the packaging complexity. Without the required active battery power saving operations, such a wireless transponder system can respond to readers/interrogators quickly without the need for a complex system level power management operation. To further reduce the cost and complexity of a wireless transponder, the monitoring, recording and storage of data must be executed in an efficient manner without occupying a large amount of memory, but, at the same time, providing adequate data visibility to the end user.

It is desirable to allow the use of the same reader/interrogator for both extremely low cost, off-the-shelf, purely passive wireless transponder devices and wireless transponder devices with enhanced functionality, such as, but not limited to, added sensors, extended memory, extended range, and enhanced security.

SUMMARY OF THE INVENTION

The present invention provides a method and system for inventorying wireless transponders, referred to as RFID transceiver devices that have a higher functionality than typical passive RFIDs, and yet are implemented with techniques that provide lower cost and battery requirements. The RFID transceiver devices can be certifiable by a recognized standards body, such as EPCglobal, or are compatible with recognized standards Backscatter techniques of conventional passive RFIDs are used in the present invention to keep cost and battery requirements low. To provide higher functionality, a microcontroller is used in the RFID, along with a battery, but the clock frequency of the microcontroller is adjusted, based on external input, to minimize battery requirements. In one embodiment, the microcontroller initially has a zero or near zero clock frequency. A comparator compares the received RF energy to a threshold, and when the threshold is exceeded, indicating the presence of a probe signal from an RFID reader, the microcontroller clock frequency is immediately increased. The comparator threshold is also adjusted, allowing for reliable detection of data on the probe signal, which is input to the microcontroller. The clock frequency of the microcontroller can be further adjusted based on the received data.

In an alternate embodiment, the clock frequency of the microcontroller can be further adjusted based on data from sensors, in order to keep the clock speed at the proper speed to adequately process the data while minimizing the power requirement of the microcontroller, and then create an input to modulate the backscattered signal to be transmitted by the RFID. The received data can also cause the microcontroller to request that sensors generate sensing data at a faster rate, which in turn requires the microcontroller clock to increase to handle the increased sensor data. In an additional embodiment, multiple sensors are multiplexed to provide a single input stream to the microcontroller, reducing the microcontroller clock speed required, along with the overall cost of the microcontroller and sensors. In another embodiment, the interface between the sensors and the microcontroller contains logic circuitry to reduce the required microcontroller clock speed. In another embodiment, the microcontroller clock is increased by a timer, i.e., the microcontroller is turned on at a specific time, or periodically, to process sensor data, or the clock speed is increased to handle additional sensor data at specific times.

The invention will be more fully described by reference to the following drawings.

DETAILED DESCRIPTION

Figure 1:
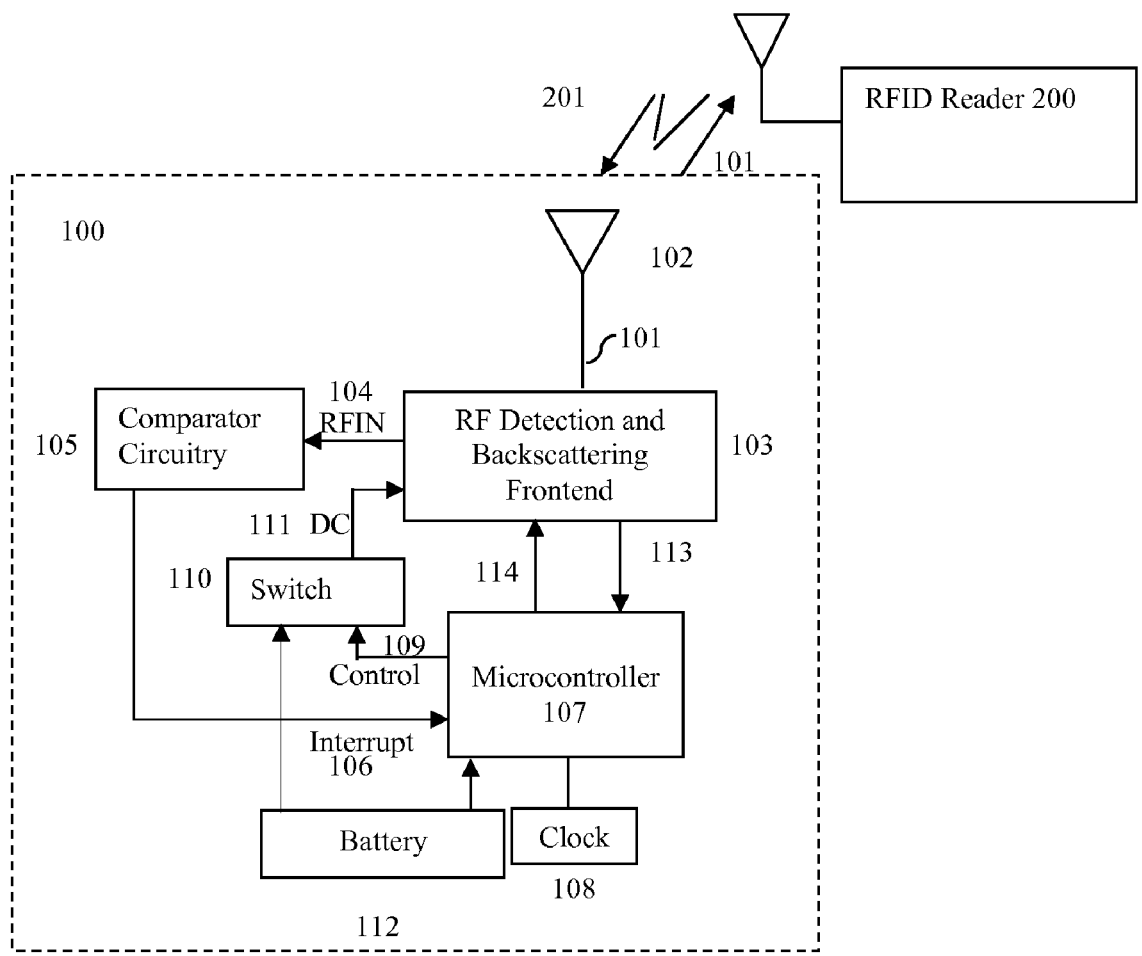
FIG. 1 is a schematic diagram of an embodiment of the RFID transceiver device in accordance with the teachings of the present invention.

Reference will now be made in greater detail to preferred and additional embodiments of the invention. Wherever possible, the same reference numerals will be used throughout the drawings and the description to refer to the same or like parts.

FIG. 1 illustrates an embodiment of RFID transceiver device 100. Antenna 102 receives probe 201 from RFID reader 200, and transmits signal 101 back to RFID reader 200. RF detection and backscattering frontend 103 receives signal 201 from antenna 102 and sends RF signal RFIN 104 to comparator circuitry 105. When RF signal RFIN 104 exceeds a threshold, comparator circuitry 105 sends interrupt signal 106 to microcontroller 107 for increasing the speed of clock 108. If microcontroller 107 initially was turned off with a clock speed of zero, interrupt signal 106 increases the clock speed to turn on microcontroller 107. Microcontroller 107 also outputs control signal 109, which causes switch 110 to provide DC power 111 from battery 112 to RF detection and backscattering frontend 103. DC power 111 turns on a comparator in RF detection and backscattering frontend 103 whose output signal 113 provides data from signal 201 to microcontroller 107. Microcontroller 107 also provides input signal 114 to RF detection and backscattering frontend 103 to modulate signal 201 to provide the backscattered signal 101 that is transmitted to RFID reader 200. This embodiment supports a low power and compact size implementation of a wireless transponder device by employing a passive RF frontend similar to that of a purely passive wireless transponder device, which derives its entire operational power by rectifying energy from an RF signal. The key advantages of such an RF frontend are that no standby current is required for the circuit and the wireless transponder device can provide an instant response to a reader/interrogator. Additionally, since no RF transceiver that requires power is being used, the peak power requirement can be significantly lowered, allowing the use of a smaller battery for powering advanced or additional transponder device functionality.

Figure 2:
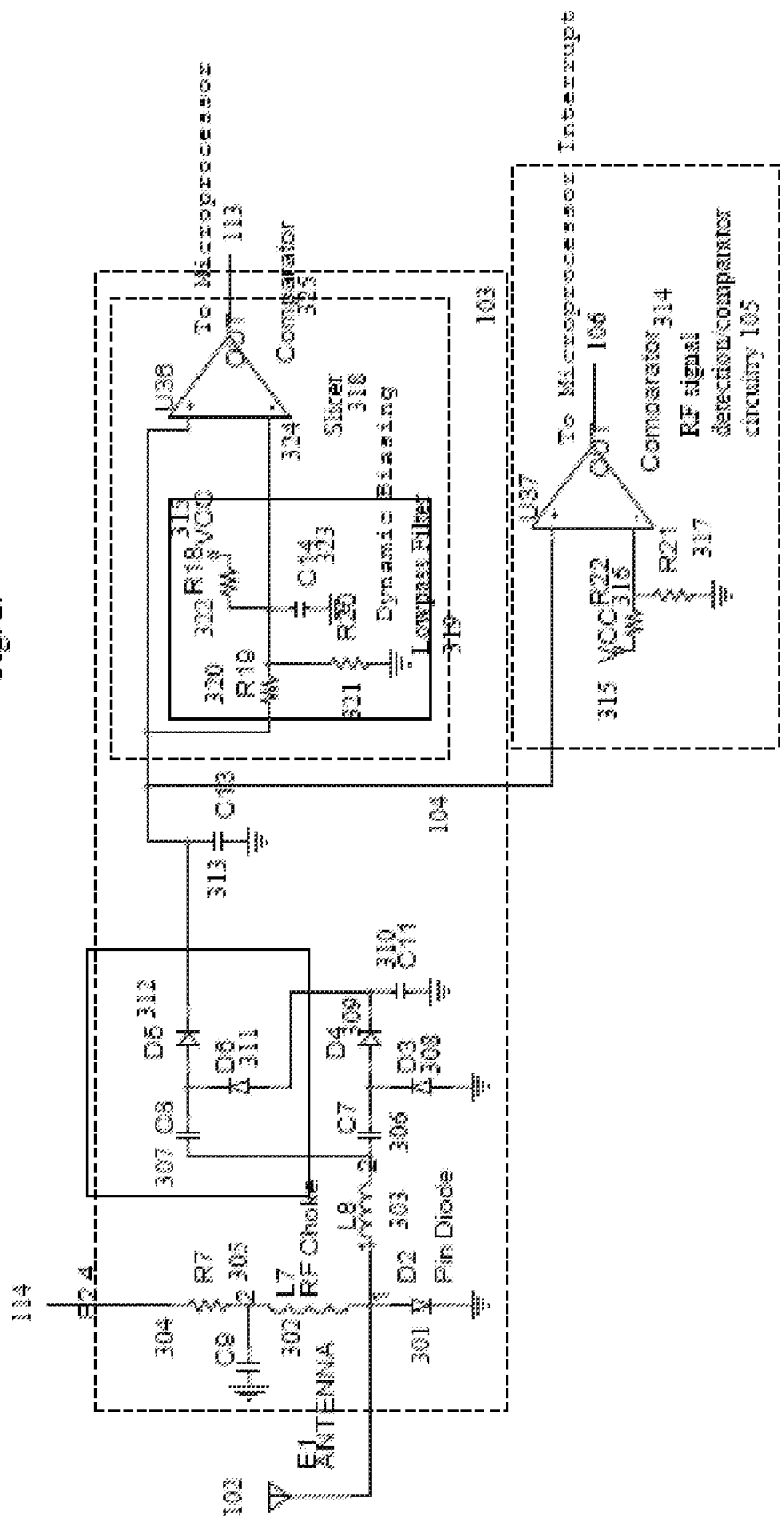
FIG. 2 is a schematic diagram of an embodiment of an RF detection and backscattering frontend of the RFID transceiver device.

RF detection and backscattering frontend 103 employs a diode rectifying circuit to demodulate and recover the reader baseband modulating signal. FIG. 2 shows an embodiment of this circuitry, which includes comparator circuitry 105. Antenna 102 is connected to diode 301, RF choke inductor 302, and inductor 303. The other end of inductor 302 is connected to capacitor 304 and resistor 305, which receives input signal 114 from microcontroller 107 shown in FIG. 1. The other end of inductor 303 is connected to capacitor 306 and capacitor 307. A first pair of Schottky diodes 308 and 309 is used to rectify the RF signal from antenna 102 and store the charge in capacitor 310. A second pair of Schottky diodes 311 and 312 is added to the first pair to increase the output voltage of RF signal RFIN 104 which is stored in capacitor 313. These diodes provide rectifying with to charge capacitor 313 on both the positive and negative swing of the received signal voltage. The output of the Schottky diodes 311 and 312, voltage of RF signal RFIN 104, is connected to comparator circuitry 105 for RF signal detection, which uses low speed comparator 314 to detect the presence of the RF probe signal by comparing voltage of RF signal RFIN 104 to VCC voltage 315 which is connected via resistor 316, grounded through resistor 317, to comparator 314. Low speed comparator 314 consumes very low power such that it could be powered by an RF harvesting circuit. The output of comparator circuitry 105 is interrupt signal 106, as also shown in FIG. 1, which is used to trigger the microcontroller 107 shown in FIG. 1 and turns on the receiver operation. The output of Schottky diodes 311 and 312, voltage of RF signal RFIN 104, is also connected to slicer 318 inside RF detection and backscattering frontend 103. Low pass filter 319, which contains resistors 320, 321, and 322, voltage 315, and capacitor 323, and couples to negative input 324 of comparator 325, provides the detecting reference level of slicer 318. Since low-pass filter 319 averages out the RF modulation, reference level 324 settles at the average level of the signal voltage of RF signal RFIN 104. This allows comparator 325 to slice RF signal RFIN 104 and provides a digital baseband signal at RF detection and backscattering frontend 103, which is coupled to microcontroller 107. Slicer 318 typically operates at a fast speed and consumes a higher amount of power. Accordingly, slicer 318 can be powered by battery 112. Comparator circuitry 105 provides interrupt signal 106 to connect the battery power to the slicer to activate its operation, as shown in FIG. 1.

Pin-diode 301 provides an open or short connection to antenna 102, and serves as the backscattering circuit. The open or short circuit control of pin diode 301 is under the control of a microcontroller. RF detection and backscattering frontend 103 adapts itself to different input RF signal levels, powers and consumes no, or extremely low, power during the standby mode. The combination of the diode circuit with comparator 314 to provide interrupt signal 106 allows a "close-to zero" power standby mode with a wake up in a sufficiently short amount of time for receiver operation. RF frontend circuit implementations, fulfilling the same requirements, could be used with the teachings of the present invention.

In one embodiment, a software radio architecture is employed in which the recovered baseband waveform is sampled, digitized and processed with a microcontroller. Microcontroller 107 is in a standby mode when no RF signal is detected. In the standby mode, microcontroller 107 operates using clock 108 at a very low frequency and consumes virtually no power. Microcontroller 107 shuts off most of its internal circuits except for certain peripheral circuits that allow it to detect interrupt signals or timer circuits that can be programmed such that microcontroller 107 wakes up at certain time intervals. Microcontroller 107 requires little computing processing power during this low power state.

In order to detect the presence of an RF signal, in FIG. 2 RF signal RFIN 104 from the RF detection circuitry is connected to comparator 314. Comparator 314 is used to detect the rectified RF level against a threshold voltage. If the RF level exceeds the threshold voltage, the presence of the RF signal is detected. Interrupt signal 106 which is the output of comparator 314 is used to interrupt microcontroller 107 and allows microcontroller 107 to transition from a standby mode to an active mode. Power consumption of comparator 314 depends on its response time. For a slow response time, on the order of hundreds of microseconds, comparator 314 can consume extremely low power, less than a microamp. Comparator 314 in comparator circuitry 105 can be powered by either an onboard power source, such as battery 112 or an RF harvesting circuit as part of RF detection and backscattering frontend 103, as shown in FIG. 1.

Once the presence of the RF signal is detected, comparator 314 generates interrupt signal 106 for microcontroller 107. Microcontroller 107 then transitions from a standby mode to an active mode to process the received waveform. In RF detection and backscattering frontend 103, self-biasing slicer 318 is used to convert the analog baseband waveform into a hard limited signal consisting of high and low pulses which are sampled by microcontroller 107 directly. Slicer 318 is used to detect a binary digitally-modulated AM signal which is commonly used in readers/interrogators, including readers conforming to EPCglobal, ISO or other known standards. The preferred embodiment includes the use of a slicer, but other embodiments may not. For other types of signals, an analog-to-digital converter can be used to sample the analog baseband waveform coming out of the RF detection circuit. It is also possible for a microcontroller to directly sample the analog waveform of a binary, digitally modulated AM signal as long as the analog baseband waveform resembles a digital stream with its high level close to the supply voltage, its low level close to ground, and a transition time from the high level to the low level that is short relative to the duration of the high or low level. Slicer 318 can be turned off in the absence of an RF signal to conserve battery power. As soon as an RF signal is detected, slicer 318 can be turned on to convert the waveform.

Comparator 314 performs essentially the same function as a slicer. In an alternate embodiment, comparator 325 in slicer 318 and comparator 314 in comparator circuitry 105 can be the same comparator. Accordingly, the comparator and the slicer are the same circuit with a different biasing current. The comparator, biased with a low current, is used to monitor for the presence of the RF signal. When the RF signal is detected, the comparator is biased at an adequate current to support the faster speed of the AM modulated waveform.

In microcontroller 107, the sampled baseband waveform is parsed to detect the preamble or frame sync and to detect the signaling data and message from RFID reader 200. In the preferred embodiment that supports the decoding of an EPCglobal C1G2 signal, the preamble or frame sync starts with a delimiter. Following the delimiter, a data_0 symbol with a duration equal to Tari, and an RTcal symbol with a duration equal to the sum of the duration of a data_0 and a data_1 symbol is detected. RTcal allows the tag to set the pivot duration equal to RTcal/2. The pivot duration is used for detection of a data_0 and data_1 symbol. Any symbol with a duration longer than the pivot is interpreted as data_1 and any symbol with a duration shorter than a pivot is interpreted as data_0. For the preamble only, a TRcal symbol follows the RTcal symbol. The TRcal symbol duration is used by the RFID transceiver device to set the backscattering link frequency. For the frame sync, there is no TRcal symbol following the RTcal symbol. By detecting data_0 and data_1, a digital stream carrying a message can be decoded following the EPCglobal C1G2 specification. The RFID transceiver device could be altered to decode other standard specifications.

In the preferred embodiment, clock 108 is derived from a low frequency clock oscillator using an internal phased-locked loop. Clock 108 can be configured to different frequencies. At a lower clock frequency, microcontroller 107 can operate at a lower supply voltage. It is desirable to operate at as low a clock frequency as possible such that microcontroller 107 can still operate at a supply voltage close to the EDV (end of discharge voltage) of battery 112. The lower the clock frequency, the greater the battery life and device operational temperature range provided by battery 112. The power consumption of microcontroller 107 is proportional to its clock frequency. Accordingly, another benefit of the lower clock speed is the reduction in the current consumption.

Figure 3:
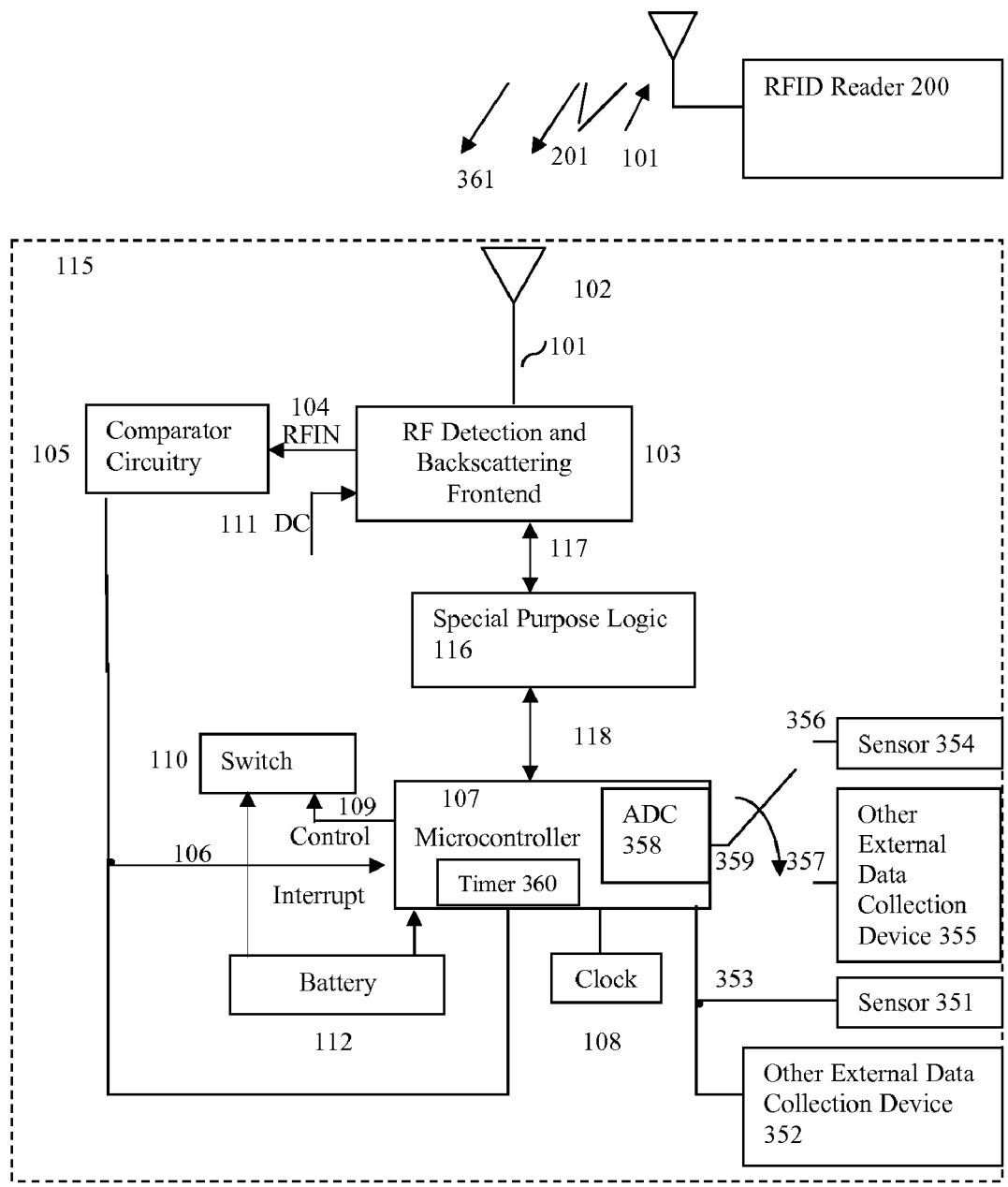
FIG. 3 is a schematic diagram of an alternate embodiment of the RFID transceiver device with a special purpose logic circuit.

In RFID transceiver device 100, the receiver function is handled in software by microcontroller 107. Typical microcontrollers are designed to handle serial processing operations. To perform parallel processing operations, the clock frequency of the microcontroller needs to increase. A majority of microcontroller operations are designed to simultaneously handle multiple bits with bus widths typically equal to 8, 16, 32, or 64 bits. This operation represents a waste of power if the number of bits to be processed is less than the bus width. It is more power efficient to employ a special purpose logic circuit to handle the receiver operations that require a high clock speed. FIG. 3 illustrates an alternative embodiment of the RFID transceiver device 115. RFID transceiver device 115 employs special purpose logic circuit 116 to provide the processing of the receiver functions such as, for example, the decoding of the preamble or the frame sync, the detection of the bit duration, and the decoding and generation of messages from and to a reader/interrogator. Input and output lines 113 and 114, shown in FIGS. 1 and 2, are replaced by bidirectional lines 117 and 118 from special purpose logic circuit 116. This architecture lowers the overall power consumption by using special purpose logic circuit 116 to handle the receiver function. The use of special purpose logic circuitry also allows microcontroller 107 to operate at significantly lower clock speeds for sensor operation. The addition of the special purpose logic circuit only marginally increases the overall system cost.

The architecture of RFID transceiver device 115 shown in FIG. 3 also provides an enhanced capability to the transponders. Sensor 351 and other external data collection device 352 have digital interfaces and microcontroller 107 can easily be programmed to provide signaling for serial or parallel interface 353. Sensor 354 and other external data collection device 355 have only analog interfaces 356 and 357, corresponding to sensor 354 and other data collection device 355, and microcontroller 107 can control internal ADC 358 to sample the outputs from analog interfaces 356 and 357. Many low cost commercial microcontrollers are equipped with on-chip ADCs. With on-chip ADC 358, multiplexer 359 is used to provide multiplexed inputs from the analog interfaces 356 and 357 to ADC 358, such that the single ADC 358 can be used to sample the multiple external data collection devices 354 and 355. Multiplexer 359 can be further enhanced to be reconfigurable to handle a variety of sensors and different sets of sensors simultaneously. In another embodiment, an external ADC can be used.

Most sensors other external data collection devices only need to be sampled at some time interval. For example, a temperature sensor does not need to sample its environment at a frequency of several thousand times per second since the temperature typically does not change that fast. Another embodiment is the use of timer 360 on microcontroller 107, to schedule periodic sampling of sensors 351 and 354, and other external data collection devices 352 and 355. Microcontroller 107 can program timer 360 with a sensing interval and then immediately enter a low power standby mode. As soon as timer 360 expires, timer 360 generates interrupt signal 106 for the microcontroller 107 to enter an active state and process the sampling operation of sensors 351 and 354 and other external data collection devices 352 and 355.

In an alternate embodiment, a reader/interrogator command/signal 361 from reader 200 is used to change the reading frequency of sensors 351 and 354 and other external data collection devices 352 and 355 Sensor applications can require data collection over a period of, for example, one day, with a sensing frequency of about once every half a minute while other applications need data collection over a period of months, for example, about three months, with a sensing frequency of about once every 5 minutes. The use of timer 360 allows sensors 351 and 354 and other external data collection devices 352 and 355 to be easily configured based on the application scenario.

Microcontroller 107 can include two types of memory, nonvolatile and volatile. The non-volatile memory can be used to store critical information such as ID, serial number, label information or other data pertaining to, for example, merchandise to which RFID transceiver 100 device is affixed. The information can survive an event such as when a battery becomes disabled or the wireless transponder device is unable to continue to operate under conditions such as extreme out of bound temperatures. The non-volatile and volatile memory can provide increased storage capability for the processing and storage of sensor or other data. This allows more flexibility to configure the RFID transceiver device to suit different applications.

In ultralow power management, the action of saving to flash on a microcontroller too frequently can be a drain on the battery. In order to lengthen the battery life, in one embodiment, data is saved in the volatile memory of microcontroller 107 and is only saved to flash on microcontroller 107 when microcontroller 107 is awakened for other purposes.

In applications involving the use of a large volume of wireless transponder devices equipped with sensors or other added functionality, the cost of wireless transponder device is critical. It is therefore important to include only the sensors or other added functionality needed for a specific application and to remove the sensors or other added functionalities which are not needed to reduce overall cost of the system. RFID transceiver device 100 can be easily configured to do this and lower the overall cost. The application software can be configured to have different footprints depending on which sensors or other added functionalities are incorporated. A footprint corresponding to a smaller number of sensors or other added functionality results in reduced code memory and lower cost. Since multiplexed inputs to the ADC are employed to interface to multiple sensors or other added functionality, the unwanted sensors or other added functionality can be removed without affecting other parts of the system operation to provide flexibility and configurability to adapt the RFID transceiver device to different applications with optimized cost.

In order to optimize power consumption, microcontroller 107 in is put in standby mode when not reading a sensor or processing other added functionality. A timer is used to alert microcontroller 107 to read the sensor or process other added functionality at a given time interval. Sensors or other added functionality, while powered, can require some settling time before they reach a steady state condition. Since the sensor or other added functionality settling time could be quite long, it is desirable to configure the clock speed of microcontroller 107 to as low a clock speed as is sufficient to process the sensor reading or other added functionality operation to match the settling time of the sensor and thereby reduce the overall power consumption.

Since RFID transceiver device 100 and 115 can have a very long battery life, periodic sensing of sensor or processing of other added functionality can create a huge amount of data. A preferred embodiment employs configurable thresholds to monitor for sensor reading data. In one embodiment, for sensitive temperature shipments, high and low temperature thresholds are programmed into microcontroller 107 such that microcontroller 107 monitors and records the events and the event durations for which the ambient temperature exceeds the thresholds. Microcontroller 107 is programmed to record/store only important conditions from the sensor or other added functionality devices which can cause critical merchandise breakdown. For example, the events in which the temperature or shock of the merchandise exceeds a certain temperature or shock threshold can be stored. If the merchandise is damaged after a set number of events or a given duration of event or events, microcontroller 107 only records or stores that event data in its memory. Such threshold values are programmed either over the air or during initial microcontroller programming at the factory. If RFID transceiver device 100 and 115 samples at a regular interval, there may not be enough granularity and some of the events might be missed. Thus, in one embodiment, if RFID transceiver device 100 or 115 detects that it is close to an out of bounds limit, it reduces its sampling interval and samples more frequently. This action reduces the chance of missing some events. In the case of a shock sensor, the typical shock event is normally preceded with vibration, a free fall or high acceleration condition. The shock sensor is programmed to detect these conditions and issues interrupt signal 106 to wake up microcontroller 107 to activate the sensor operation. This increases battery life. An embodiment of the storage for sensor data is shown in Table 1.

TABLE 1

Last Sampled Value (1 Byte)
Total Samples (2 Bytes)
Number Of Time Crossed Limit (2 Bytes)
Max Temp Reached (1 Byte)
Min Temp Reached (1 Byte)
Total Time Out Side Limit (4 Bytes)
Sampling Time (2 Bytes)
Default Sampling Time (2 Bytes)
Threshold Sampling Time (2 Bytes)
Max Temp Limit (1 Byte)
Min Temp Limit (1 Byte)
Max Threshold Temp (1 Byte)
Min Threshold Temp (1 Byte)
Hysteresis (1 Byte)
Time when Outside the limit (4 Bytes)
Time When came back from out (4 Bytes)
Unix Time Stamp (4 Bytes)

Microcontroller 107 can also be programmed to change the sensing or other added functionality processing interval based on the in situ conditions. Interval changes can be programmed either over the air or during initial microcontroller programming at the factory. In some applications, it is important to monitor the sensors or other added functionality devices with a higher frequency as the data readings get closer to the thresholds. This provides the benefit that if an event could exceed a data threshold within the time of a standard wake-sleep period; the shortened interval reduces the chance that the data reading might miss such an event. In this case, microcontroller 107 can be configured to shorten its timer period to provide more frequent readings as the data readings approach the thresholds.

In some situations, the battery voltage can drop below a level at which RFID transponder device 100,115 ceases to be able to communicate effectively with RFID reader/interrogator 200. This can be due to an ambient temperature drop that causes the supply voltage of the battery to drop accordingly or to a battery simply being discharged due to use. In this situation, however, the battery supply voltage might still be able to support data readings or other onboard functionality that only require a low clock frequency for microcontroller 107. In another embodiment, recorded sensor data or other onboard functionality data is read and the stored in the non-volatile memory of the microcontroller if the battery supply voltage is too low. As soon as the battery issue is resolved, the recorded sensor or other onboard functionality data can be retrieved by a reader.

Since the processing of receiving and sending data to and from reader can drain battery more rapidly, when low on battery, in another embodiment the RFID transceiver device 100,115 is put into a hibernating mode such that it only monitors and stores the sensor data while the battery can still sustain it without responding to any signals from RFID reader 200. This increases critical battery life. RFID transceiver device 100,115 can subsequently be placed in a docking fixture to restore its battery power. The data stored can then be read from the battery in the docking station or over the air if the battery power allows.

In another embodiment, a real-time clock (RTC), on microcontroller 107 is used to time-tag the data in RFID transceiver device 100,115. The RTC starts in an arbitrary state and provides a time stamp to the sensor data using the free-running RTC. When reader/interrogator 200 reads the data on RFID transceiver device 100,115, it reads the RTC on RFID transceiver device 100,115 and compares this RTC with its own RTC to find the offset. When RFID reader 200 retrieves any data and the associated time stamp, RFID reader 200 adds the offset back to the timestamp to restore the real time clock reading. With this embodiment, there is no need to initialize the RTC of RFID transceiver device 100,115.

In another embodiment, the read and write commands in memory of RFID transceiver device 100,115 that are specified in the EPCglobal, ISO or another standard are modified so as to embed the protocol for sensor or other data reading. Predefined specific memory locations are used for passing read and write sensor or other data commands and storing sensor data. Specific memory locations are used as mailboxes for both commands as well as for the data. In order to provide a method to identify RFID transceiver device 100,115, one or two unique words are stored in a certain memory location for identification. The unique words are unique patterns and are different from the EPC or Tag ID (TID). Once RFID reader 200 finds the unique words in specific memory locations, it associates RFID transceiver device 100,115 as a special RFID transceiver. Using this approach, the sensor reading or other data processing operation is standards-compliant, and an off-the-shelf standards-compliant reader can be used to read and write the sensor or other data in the higher functionality wireless transponder device. Another embodiment to identify a special type of RFID transceiver device is to store data in a high memory location which is not normally available in a passive RFID transceiver device. If the reader reads this memory location from an off-the-shelf passive RFID transceiver device, it will yield an error code, such as error code: 00000011: memory overrun or unsupported C value. If the reader reads this memory location from a special RFID transceiver device, it will yield a value and no error code.

In another embodiment, scrambling of the data location is performed at RFID transceiver device 100,115. The address is common for all conventional reader and graphical user interface software, which means that all readers can try to read the information at this address but only a special type of RFID transceiver device 100,115 recognizes and translates the special address. Accordingly, RFID reader 200 can identify a special type of RFID transceiver device. The special type of RFID transceiver device 100,115 replies with valid information, but other conventional passive RFIDs will reply with error codes because this address does not exist in their memory.

In another embodiment, a special type of RFID transceiver device 100,115 is identified by using a false address which does not exist in any conventional passive RFID transceiver device. The false address could have 4 or 6 bytes, the first two bytes could be the special RFID transceiver device signature. When the special RFID transceiver device 100,115 receives this address, it translates this false address into the address where the information is stored.

In another embodiment, modulation and demodulation is implemented in software in microcontroller 107 to further lower costs. The EPCglobal air interface defines a "Tag to Interrogator" interface using backscatter modulation with or without a subcarrier, and an "Interrogator to tag" interface using double sideband amplitude shift keying (DSB-ASK) with pulse interval (PIE) encoding. The low speed microcontroller with common peripherals, such as a timer and serial peripheral interface (SPI) is used to implement the interfaces, thus providing significant flexibility with low cost.

Implementing a modulator circuit using microcontroller 107 requires the precise control of software timing. A serial communication interface can be used to output a precise timing modulation signal. The serial communication interface typically provides a buffer for loading multiple bits of data. Typical serial interfaces have buffers in multiple of 8 bits, depending on the depth of the buffer. As long as the buffer is refilled before it is depleted, a continuous and precise timing modulating signal can be output from the serial interface. This embodiment allows a much higher signaling rate to be achieved as compared to a conventional bit-banging technique. It should be noted that the serial interface clock rate can be slaved to external or internal clock sources. An example of such a clock source is a conventional pulse width modulation (PWM) generator which can be used in microcontroller 107. The use of these clock sources allows the symbol time to be changed, which provides a variable symbol rate.

Figure 4:
FIG. 4 is a schematic diagram of data encoding, tag to interrogator, for a data-0 and a data-1 without a subcarrier.
Figure 5:
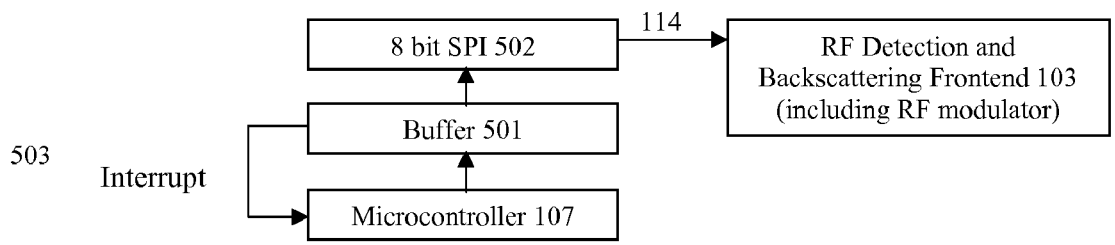
FIG. 5 is a schematic diagram of an embodiment of the RFID transceiver device for software modulation for data encoding, tag to interrogator, for a data-0 and a data-1 without a subcarrier.

For data encoding from the tag to the interrogator without the subcarrier, data-0 and data-1 are encoded as shown in FIG. 4, where a data-0 is encoded as positive pulse 401 followed by negative pulse 402, and a data-1 is encoded as two positive pulses 403 and 404. In software, data-0 is represented as 2 binary bits: 10 and data-1 is represented by binary bits: 11. FIG. 5 shows a block diagram of the modulator. Software in microcontroller 107 pre-calculates the binary stream and uses buffer 501 to transmit the binary stream with an 8 bit SPI interface 502 using input signal 114 to the RF modulator in the RF detection and backscattering frontend 103 to transmit without interruption, i.e., independent of interrupt 503 from buffer 501. For EPCglobal, the highest link frequency is 640 kHz, and thus interrupt 503 of buffer empty will be generated every 4 data bits (8 binary bits) which is 6.25 µs. During this period, microcontroller 107 loads the next 8 bits for transmitting.

Figure 6:
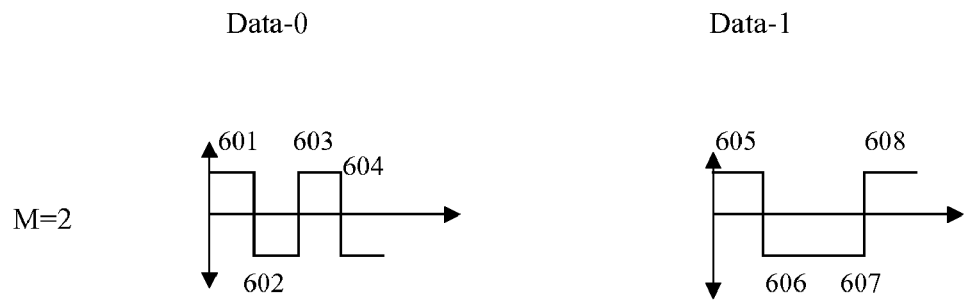
FIG. 6 is a schematic diagram of data encoding, tag to interrogator, for a data-0 and a data-1 with a subcarrier.

For data encoding from the tag to the interrogator with the subcarrier, the baseband signal is Miller-modulated by a subcarrier. In this embodiment, the reversal of the baseband signals for data-0 and data-1, as in FIG. 4, is used where data-0 is two positive pulses and data-1 is a positive pulse followed by a negative pulse. The frequency of the subcarrier is 2, 4 or 8 times of the data rate, which corresponds to a Miller rate of 2, 4, and 8. FIG. 6 shows the waveforms for data-0 and data-1 for a Miller rate of 2. A data-0 is encoded as positive pulse 601, followed by negative pulse 602, followed by positive pulse 603, and followed by negative pulse 604. Data-1 is encoded as positive pulse 605, followed by two negative pulses 606 and 607, and followed by positive pulse 608. Accordingly, data-0 is encoded as 1010 and data-1 is 1001.

Figure 7:
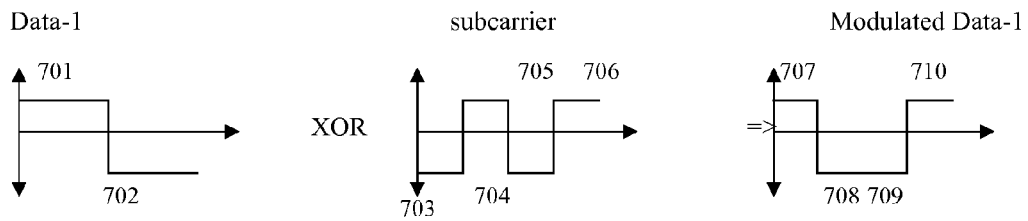
FIG. 7 is a schematic diagram of data encoding, tag to interrogator, for a data-0 and a data-1 with a subcarrier using an exclusive-or gate.

If there is not enough memory, an alternative embodiment is to add an exclusive- or (XOR) gate to modulate the baseband signal. This has the additional benefit of also slowing down the SPI interrupt rate on interrupt 503. FIG. 7 shows the process of modulating data-1 onto a subcarrier with a Miller rate of 2. Data-1, which is positive pulse 701, followed by negative pulse 702, is XOR-ed with a subcarrier with positive 703, negative 704, positive 705, and negative 706 pulse sequence, to generate a modulated data-1 with positive 707, two negative 708 and 709, and positive 701 pulse sequence, as shown in FIG. 6.

Figure 8:
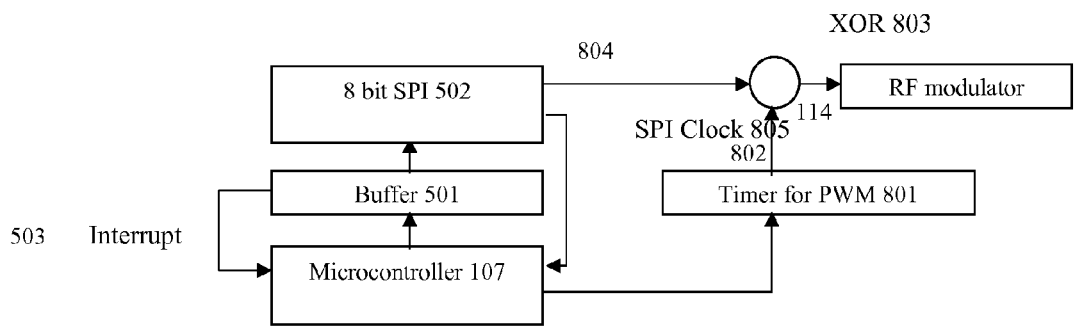
FIG. 8 is a schematic diagram of an embodiment of the RFID transceiver device for data encoding, tag to interrogator, for a data-0 and a data-1 with a subcarrier using an exclusive-or gate.

An embodiment to enable the subcarrier to have the same phase as the data is shown in FIG. 8. Since most conventional peripheral timers with a Pulse Width Modulator (PWM) can generate a 50% duty cycle waveform, PWM timer 801 is used as a subcarrier generator for input 802 into XOR 803, along with SPI data output 804. SPI clock output 805 is used to interrupt microcontroller 107 for phase information which adjusts the PWM phase to align with SPI data output 804. For different Miller modulation rates, the PWM frequency is changed.

Figure 9:
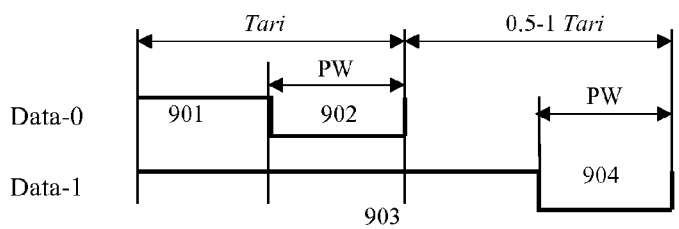
FIG. 9 is a schematic diagram of data encoding, interrogator to tag, for a data-0 and a data-1 without a subcarrier.

FIG. 9 shows interrogator to tag encoding using pulse interval encoding (PIE) modulation. Data-0 is positive pulse 901 followed by negative pulse 902 of duration PW, with a total duration of Tari. Data-1 is positive pulse 903 that is longer than a Tari, followed by negative pulse 904 of duration PW, with a total duration of 1.5 to 2 Tari. A Tari could be 6.25 to 25 µs. The difference between data-0 and data-1 is the time interval between rising edges of the pulses.

Figure 10:
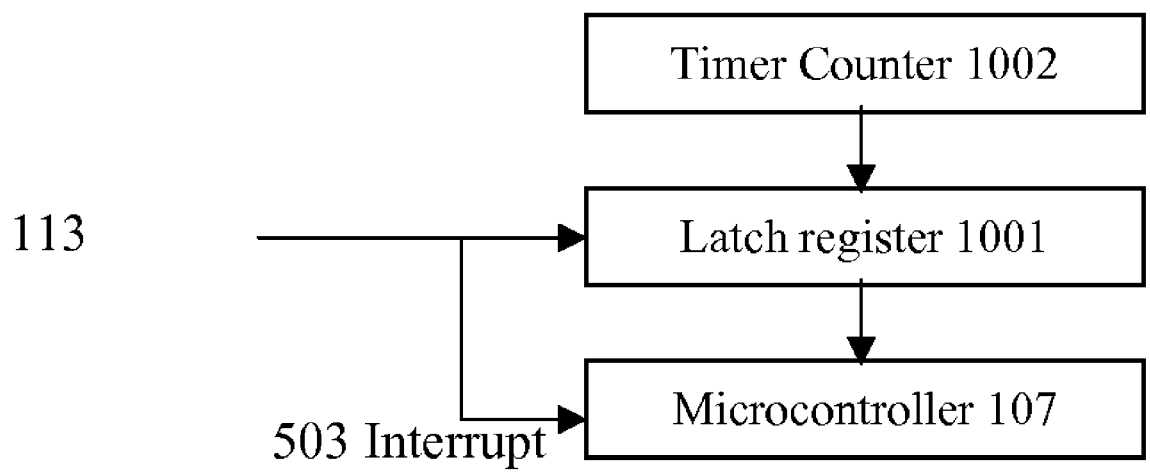
FIG. 10 is a schematic diagram of an embodiment of the RFID transceiver device for data decoding, interrogator to tag, for a data-0 and a data-1.

An embodiment of the data demodulator is shown in FIG. 10, which uses a capture function of the hardware timer for accurate measurements. Output signal 113 from RF detection and backscattering frontend 103 is fed into latch register 1001, which uses timer counter 1002, and rising edge of output signal 113 is used also as interrupt signal for microcontroller 107. Upon an interrupt signal, microcontroller 107 reads the latch time from latch register 1001 to decode the data.

A man-machine interface (MMI) or programming application interface (API) can be provided for the user which can control RFID reader 200 for inventory, sensor data reading, and the configuration of the tag. The preferred embodiment is to include middleware which deals with the lower layer operation of RFID reader 200, the on-the-air protocol, and retrieving and writing of data to and from specific locations in the tag memory, while presenting a high (application) level interface to the MMI or API. The programming API has similar command and response messages to the command and response in the MMI. The middleware resides in a host device and can communicate with RFID reader 200 using a reader specific API. This allows users to adapt and integrate RFID reader 200 and tags into their operation quickly. This also allows users not to have to deal with different readers having different APIs. One example use is to retrieve the sensor out-of-bound indicators. In this example, a simple API controls RFID reader 200 to find the specific tag (or a number of tags) and retrieve the sensor out-of-bound indicators from a specific memory location.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. An RFID transceiver device for transmitting sensor data comprising:

a microcontroller with a clock, said clock having an adjustable speed that is changed by an external input signal, at least one sensor coupled to the microcontroller;
backscatter circuitry associated with the microcontroller for transmission of a backscattered signal from the microcontroller to an RFID reader; and
a battery to power the microcontroller,
wherein data from the at least one sensor is stored in non-volatile memory of the microcontroller if the battery is at a predetermined low level, and is read later when the battery is at a higher level.

2. The RFID transceiver device of claim 1 wherein the speed of said clock is adjusted by the external input to minimize a power requirement.

3. The RFID transceiver device of claim 2 wherein the power requirement is a battery size.

4. The RFID transceiver device of claim 1 further comprising:
circuitry to instantly increase the speed of said clock from a low speed to a higher speed in response to a probe signal from the RFID reader.

5. The RFID transceiver device of claim 4 wherein said circuitry comprises a comparator and a switch to change the clock speed.

6. The RFID transceiver device of claim 5 further comprising:
a slicer to demodulate a data signal from the RFID reader.

7. The RFID transceiver device of claim 6 further comprising:
a diode circuit to rectify the data signal and charge a capacitor on both a positive and negative swing of the data signal.

8. The RFID transceiver device of claim 7 wherein the comparator and slicer speeds are adjusted for a "close-to zero" power standby mode and a wake up time short enough for proper operation of the RFID transceiver device.

9. The RFID transceiver device of claim 6 wherein the slicer and the comparator are one comparator circuit.

10. The RFID transceiver device of claim 6 wherein the slicer uses a reference signal level derived by filtering the level of the external input signal with a resistive and capacitive network.

11. The RFID transceiver device of claim 1 wherein a supply voltage to the microcontroller is adjusted to improve battery life based on the clock speed.

12. The RFID transceiver device of claim 1 further comprising a special purpose logic circuit to handle a receiver function of the RFID transceiver device, while the microcontroller handles operation of the at least one sensor.

13. The RFID transceiver device of claim 12 further comprising a plurality of said sensors wherein the sensors are interfaced to the microcontroller through a multiplexer, said multiplexer being reconfigurable.

14. The RFID transceiver device of claim 1 where the external input signal is generated by a timer.

15. The RFID transceiver device of claim 1 where the external input signal is generated by a signal transmitted by the RFID reader.

16. The RFID transceiver device of claim 1 wherein the at least one sensor is controlled by a timer, with a period for the timer adjustable by a signal transmitted by the RFID reader.

17. The RFID transceiver device of claim 1 wherein data from the at least one sensor is stored by said microcontroller only during a critical condition.

18. The RFID transceiver device of claim 1 wherein data from the at least one sensor is stored at a faster rate during a critical condition.

19. The RFID transceiver device of claim 1 wherein data is stored in a volatile memory of the microcontroller and is only saved to the non-volatile memory of the microcontroller when the microcontroller is awakened for other purposes.

20. The RFID transceiver device of claim 1 wherein modulation and demodulation is performed in software in the microcontroller.

21. The RFID transceiver device of claim 1 wherein a special type of the RFID transceiver device is identified by scrambling of an address of a data location or using a false address.

22. An RFID transceiver device for transmitting sensor data comprising:
a microcontroller with a clock, said clock having an adjustable speed that is changed by an external input signal,
at least one sensor coupled to the microcontroller;
backscatter circuitry associated with the microcontroller for transmission of a backscattered signal from the microcontroller to an RFID reader; and
a battery to power the microcontroller;
wherein data from the at least one sensor is time stamped with an initial free running real time clock until time synchronization is achieved, and a difference between the free running clock and synchronized clock is used to modify the timestamp.

23. An RFID system comprising an RFID reader and an RFID transceiver device, for transmitting sensor data, with the RFID transceiver device comprising:
a microcontroller with a clock, said clock having an adjustable speed that is changed by an external input signal,
at least one sensor coupled to the microcontroller;
backscatter circuitry associated with the microcontroller for transmission of a backscattered signal from the microcontroller to the RFID reader; and
a battery to power the microcontroller;
wherein data from the at least one sensor is stored in non-volatile memory of the microcontroller if the battery is at a predetermined low level, and is read later when the battery is at a higher level.

24. The RFID transceiver device of claim 23 wherein the speed of said clock is adjusted by the external input to minimize a power requirement.

25. The RFID transceiver device of claim 24 wherein the power requirement is a battery size.

26. The RFID transceiver device of claim 23 further comprising:
circuitry to instantly increase the speed of said clock from a low speed to a higher speed in response to a probe signal from the RFID reader.

27. The RFID transceiver device of claim 26 wherein said circuitry comprises a comparator and a switch to change the clock speed.

28. The RFID transceiver device of claim 27 further comprising:
a slicer to demodulate data from the RFID reader.

29. The RFID transceiver device of claim 28 further comprising:
a diode circuit to rectify the data signal and charge a capacitor on both a positive and negative swing of the data signal.

30. The RFID transceiver device of claim 29 wherein the comparator and slicer speeds are adjusted for a "close-to zero" power standby mode and a wake up time short enough for proper operation of the RFID transceiver device.

31. The RFID transceiver device of claim 29 wherein the slicer and the comparator are one comparator circuit.

32. The RFID transceiver device of claim 29 wherein the slicer uses a reference signal level derived by filtering the level of the external input signal with a resistive and capacitive network.

33. The RFID transceiver device of claim 23 wherein a supply voltage to the microcontroller is adjusted to improve battery life based on the clock speed.

34. The RFID transceiver device of claim 23 further comprising a special purpose logic circuit to handle a receiver function of the RFID transceiver device, while the microcontroller handles operation of the at least one sensor.

35. The RFID transceiver device of claim 34 further comprising a plurality of sensors wherein the sensors are interfaced to the microcontroller through a multiplexer, said multiplexer being reconfigurable.

36. The RFID transceiver device of claim 23 where the external input signal is generated by a timer.

37. The RFID transceiver device of claim 23 where the external input signal is generated by a signal transmitted by the RFID reader.

38. The RFID transceiver device of claim 23 wherein the at least one sensor is controlled by a timer, with a period for the timer adjustable by a signal transmitted by the RFID reader.

39. The RFID transceiver device of claim 23 wherein data from the sensor is stored only during a critical condition.

40. The RFID transceiver device of claim 23 wherein data from the at least one sensor is stored at a faster rate during a critical condition.

41. The RFID transceiver device of claim 23 wherein data is stored in a volatile memory of the microcontroller and is only saved to the non-volatile memory of the microcontroller when the microcontroller is awakened for other purposes.

42. The RFID transceiver device of claim 23 wherein data from the at least one sensor is time stamped with an initial free running real time clock until time synchronization is achieved, and a difference between the free running clock and synchronized clock is used to modify the timestamp.

43. The RFID system of claim 23 wherein modulation and demodulation is performed in software in the microcontroller.

44. The RFID system of claim 23 further comprising middleware located in a host device that deals with a lower layer operation of the RFID reader, an on-the-air protocol, and retrieving and writing of data to and from specific locations in a memory of the RFID transceiver device while presenting an application level interface between a user and the RFID reader.

45. The RFID system of claim 23 wherein a special type of the RFID transceiver device is identified by scrambling of an address of a data location or using a false address.

46. A method for reading data from an RFID transceiver device using an RFID reader, and for transmitting sensor data with the RFID transceiver device comprising the steps of:
providing a microcontroller with a clock and battery to power the microcontroller,
obtaining data from at least one sensor coupled to the microcontroller;
backscattering a signal from the RFID transceiver device with backscatter circuitry;
transmitting the backscattered signal to the RFID reader;
adjusting a speed of the clock using an external input signal; and
storing data from the sensor in non-volatile memory of the microcontroller if the battery is at a predetermined low level, and reading the data later when the battery is at a higher level.

47. The method of claim 46 wherein the step of:
adjusting the speed of the clock by an external input further includes the step of minimizing a power requirement.

48. The method of claim 46 further comprising the step of:
instantly increasing the speed of the clock from a low speed to a higher speed in response to a probe signal from the RFID reader.

49. The method of claim 48 wherein the speed of the clock is adjusted using a comparator and a switch to change the speed of the clock.

50. The method of claim 49 further comprising the step of: demodulating data from the RFID reader using a slicer.

51. The method of claim 50 further comprising the step of:
rectifying the data signal with a diode circuit and charging a capacitor on both a positive and negative swing of the data signal.

52. The method of claim 51 further comprising the step of:
adjusting the comparator and slicer speeds for a "close-to zero" power standby mode and a wake up time short enough for proper receiver operation of the RFID transceiver device.

53. The method of claim 50 wherein the same comparator circuit is used for the slicer and the comparator.

54. The method of claim 53 further comprising the step of:
filtering the input signal level with a resistive and capacitive network to provide a reference signal level for the slicer.

55. The method of claim 46 further comprising the step of adjusting a supply voltage to the microcontroller to improve battery life based on the clock speed.

56. The method of claim 46 wherein a special purpose logic circuit is used to handle a receiver function of the RFID transceiver device, while the microcontroller handles operation of the at least one sensor.

57. The method of claim 56 further comprising the step of:
interfacing a plurality of said sensors to the microcontroller through a multiplexer, said multiplexer being reconfigurable.

58. The method of claim 46 further comprising the step of: generating a timer signal.

59. The method of claim 46 further comprising the step of:
adjusting the clock speed by a signal transmitted by the RFID reader.

60. The method of claim 46 further comprising the step of:
controlling the at least one sensor by a timer, with a period for the timer adjustable by a signal transmitted by the RFID reader.

61. The method of claim 46 further comprising the step of:
storing data from the sensor by said microcontroller only during a critical condition.

62. The method of claim 46 further comprising the step of:
storing data from the sensor at a faster rate during a critical condition.

63. The method of claim 46 further comprising the steps of:
storing data in a volatile memory of the microcontroller and saving the data to the non-volatile memory of the microcontroller when the microcontroller is awakened for other purposes.

64. The method of claim 46 further comprising the step of:
performing software modulation and demodulation in the microcontroller.

65. The method of claim 46 further comprising the steps of using middleware located in a host device to deal with a lower layer operation of the RFID reader, providing an on-the-air protocol, and retrieving and writing of data to and from specific locations in a memory of the RFID transceiver device while presenting an application level interface between a user and the RFID reader.

66. The method of claim 46 further comprising the step of:
identifying a special type of the RFID transceiver device by scrambling of an address of a data location or using a false address.

67. A method for reading data from an RFID transceiver device using an RFID reader, and for transmitting sensor data with the RFID transceiver device comprising the steps of:
providing a microcontroller with a clock and battery to power the microcontroller;
obtaining data from at least one sensor coupled to the microcontroller, backscattering a signal from the RFID transceiver device with backscatter circuitry;
transmitting the backscattered signal to the RFID reader;
adjusting a speed of the clock using an external input signal; and
timestamping data from the sensor with an initial free running real time clock until time synchronization is achieved, and using a difference between the free running clock and synchronized clock to modify the timestamp.

* * * * *